United States Patent
LeBeane et al.

(10) Patent No.: US 11,922,207 B2
(45) Date of Patent: Mar. 5, 2024

(54) NETWORK COMMAND COALESCING ON GPUS

(71) Applicant: Advanced Micro Devices, Inc., Santa Clara, CA (US)

(72) Inventors: Michael W. LeBeane, Austin, TX (US); Khaled Hamidouche, Austin, TX (US); Brandon K. Potter, Austin, TX (US)

(73) Assignee: Advanced Micro Devices, Inc, Santa Clara, CA (US)

( * ) Notice: Subject to any disclaimer, the term of this patent is extended or adjusted under 35 U.S.C. 154(b) by 134 days.

(21) Appl. No.: 16/993,150

(22) Filed: Aug. 13, 2020

(65) Prior Publication Data
US 2022/0050707 A1 Feb. 17, 2022

(51) Int. Cl.
*G06F 9/38* (2018.01)
*G06F 9/48* (2006.01)
*G06F 9/54* (2006.01)
*H04L 67/10* (2022.01)
*G06T 1/20* (2006.01)

(52) U.S. Cl.
CPC .............. *G06F 9/48* (2013.01); *G06F 9/3836* (2013.01); *G06F 9/3887* (2013.01); *G06F 9/54* (2013.01); *H04L 67/10* (2013.01); *G06T 1/20* (2013.01)

(58) Field of Classification Search
CPC .. G06F 9/30043; G06F 9/3851; G06F 9/3887; G06F 9/3836; G06F 9/54; H04L 43/08
See application file for complete search history.

(56) References Cited

U.S. PATENT DOCUMENTS

| 7,746,350 | B1 * | 6/2010 | Danilak | H04L 9/0631 345/538 |
| 8,392,669 | B1 * | 3/2013 | Nyland | G06F 9/3851 714/702 |
| 8,718,096 | B2 * | 5/2014 | Makineni | H04L 49/20 370/473 |
| 2016/0352598 | A1 * | 12/2016 | Reinhardt | H04L 47/365 |
| 2017/0064051 | A1 * | 3/2017 | Steinmacher-Burow | H04L 49/90 |
| 2019/0042478 | A1 * | 2/2019 | Chakrabarti | G06F 12/1408 |
| 2020/0004550 | A1 * | 1/2020 | Thakker | G06F 9/3832 |

* cited by examiner

*Primary Examiner* — Jacob Petranek
(74) *Attorney, Agent, or Firm* — Hickman Becker Bingham Ledesma LLP

(57) ABSTRACT

An approach is provided for coalescing network commands in a GPU that implements a SIMT architecture. Compatible next network operations from different threads are coalesced into a single network command packet. This reduces the number of network command packets generated and issued by threads, thereby increasing efficiency, and improving throughput. The approach is applicable to any number of threads and any thread organization methodology, such as wavefronts, warps, etc.

20 Claims, 4 Drawing Sheets

┌─────────────────────────────────────────────────────────┐
│ Threads share information about their next network     │
│ operation with other threads                            │
│                                                    102  │
└─────────────────────────────────────────────────────────┘
                            ↓
┌─────────────────────────────────────────────────────────┐
│ Threads determine whether their own next network       │
│ operation can be combined with the next network        │
│ operation of another thread                             │
│                                                    104  │
└─────────────────────────────────────────────────────────┘
                            ↓
┌─────────────────────────────────────────────────────────┐
│ Threads share with other threads whether their next    │
│ network operation can be combined with the next        │
│ network operation of other threads                      │
│                                                    106  │
└─────────────────────────────────────────────────────────┘
                            ↓
┌─────────────────────────────────────────────────────────┐
│ Generate and issue one or more network command packets │
│                                                    108  │
└─────────────────────────────────────────────────────────┘

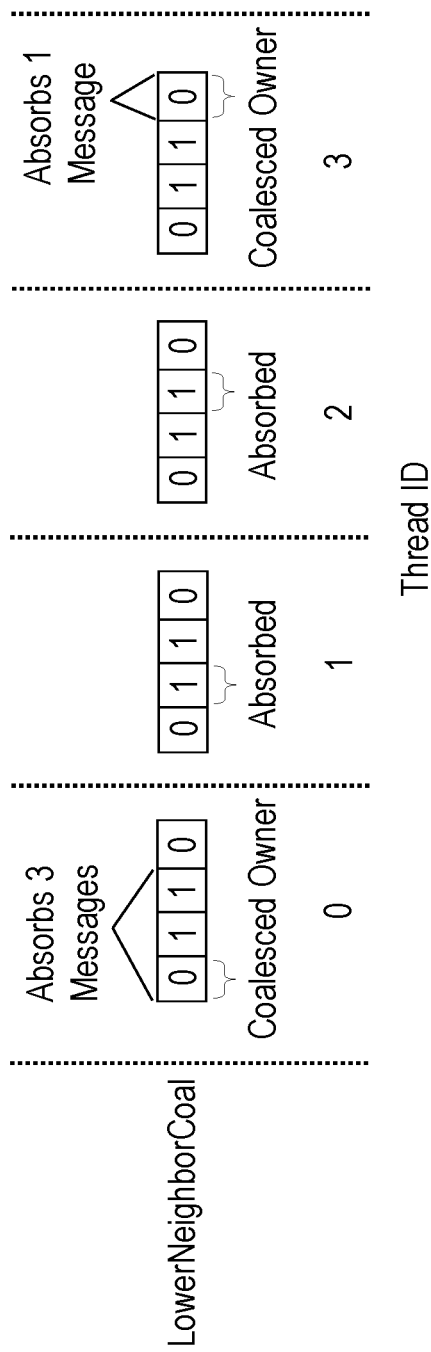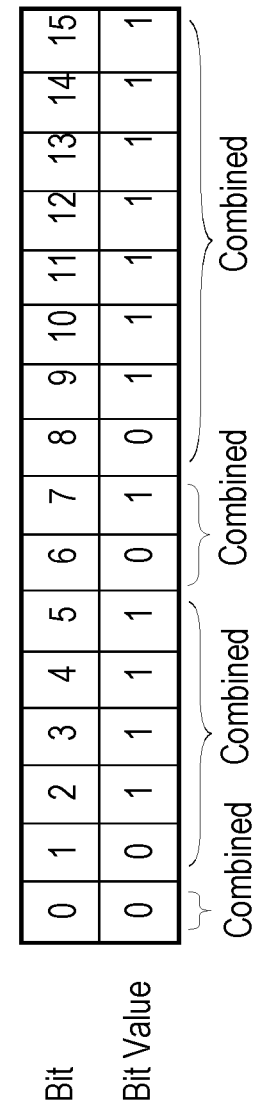

500　　　　　　FIG. 5A
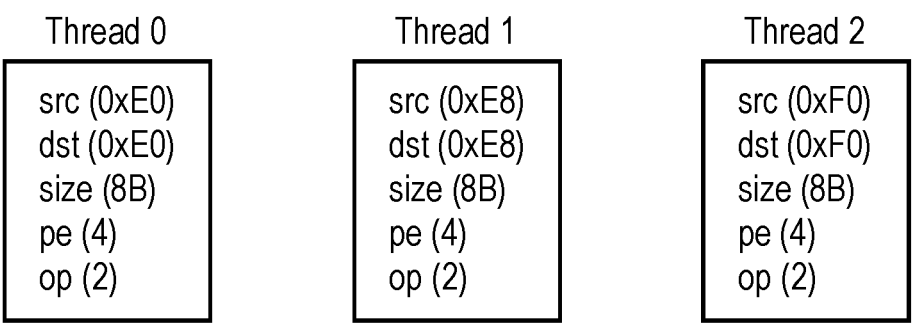
550　　　　　　FIG. 5B
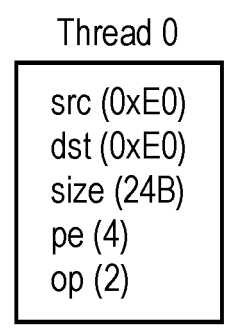

NETWORK COMMAND COALESCING ON GPUS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Graphics Processing Unit (GPU) hardware in Single Instruction Multiple Thread (SIMT) architectures often includes the capability to coalesce multiple small requests from different threads into a single larger request to improve efficiency and avoid overwhelming the memory subsystem. For example, GPU hardware may coalesce separate requests from different threads for the same operation and to contiguous memory addresses into a single larger request that is more efficiency processed.

In emerging GPU communication models that implement a SIMT architecture, threads issue network commands to access memory locations across a network in a similar manner that the threads access local memory locations. For example, threads issue remote store and retrieve commands to store data to and retrieve data from memory locations on other nodes.

GPU hardware typically includes a coalescing mechanism that combines memory accesses from different threads to reduce overhead and improve efficiency. While GPU hardware memory can be very effective for coalescing accesses to local memory locations, it is only partially effective for coalescing accesses to remote memory locations. Accesses made by threads to and from local memory to prepare command packets, e.g., to stage data in local buffers, etc., are coalesced efficiently using existing GPU hardware in the same manner that other accesses to local memory are coalesced. Once the command packets are prepared however, the GPU hardware is unable to coalesce separate network command packets into a single network command packet, even for the same operation to contiguous memory addresses on the same processing element. This results in each thread issuing separate network command packets, even for very small amounts of data, which is inefficient and can degrade performance, making it difficult to satisfy network performance requirements.

BRIEF DESCRIPTION OF THE DRAWINGS

Embodiments are depicted by way of example, and not by way of limitation, in the figures of the accompanying drawings and in which like reference numerals refer to similar elements.

FIG. 1 is a flow diagram that depicts an approach for coalescing network commands in a GPU that implements a SIMT architecture.

FIG. 4A is a block diagram that depicts how threads use the bit vectors to determine whether and how to process their next network operation and the next network operation of other threads.

FIG. 4B is a block diagram that depicts an example bit vector for 16 threads and which threads are coalesced using the techniques described herein.

FIG. 5A depicts example contents of network command packets for threads 0-2 to implement the next network operation of each thread.

FIG. 5B depicts example contents of a network command packet that implements the next network operations of three threads.

DETAILED DESCRIPTION

Figure 2:
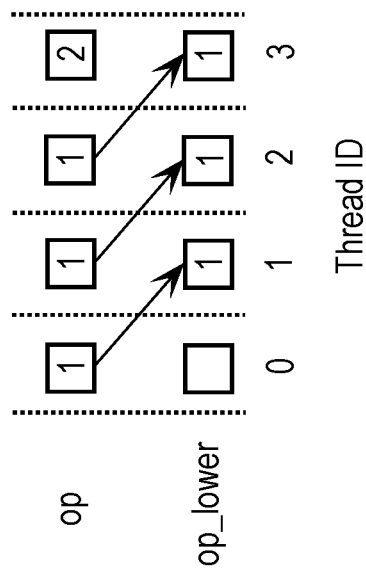
FIG. 2 is a block diagram that depicts shuffling information between threads that specifies attributes of a thread's next network operation.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.
  I. Overview
  II. Sharing Next Network Operation Information
  III. Determine Coalescability with Other Threads
  IV. Sharing Coalescability Results with Other Threads
  V. Generating Coalesced Network Command Packets I. Overview An approach is provided for coalescing network commands in a GPU that implements a SIMT architecture. Compatible next network operations from different threads are coalesced into a single network command packet. This reduces the number of network command packets generated and issued by threads, thereby increasing efficiency, and improving throughput. The approach is applicable to any number of threads and any thread organization methodology, such as wavefronts, warps, etc.

FIG. 1 is a flow diagram 100 that depicts an approach for coalescing network commands in a GPU that implements a SIMT architecture according to an embodiment. Threads, or threads of execution, may be implemented by an ordered sequence of instructions stored in one or more memories. Each of the steps of flow diagram 100 is described in more detail in separate sections hereinafter.

In step 102, threads share information about their next network operation with other threads. The information describes attributes of the next network operation.

In step 104, the threads determine whether their own next network operation can be combined with the next network operation of another thread. According to an embodiment, this is determined by a thread comparing the attributes of its own next network operation to the attributes of the next network operation of another thread.

In step 106, threads share with other threads the results of the determination of step 104, i.e., whether their own next network operation can be combined with the next network operation of another thread.

In step 108, one or more network command packets are issued, for example to a Network Interface Card (NIC), where each network command packet implements the next network operations of two or more threads. As used herein, the term "implements" means that when the network packet is processed by a processing element, the next network operations of the two or more threads are performed.

Threads whose next network operation is implemented by a network command packet do not generate and issue a network command packet.

II. Sharing Next Network Operation Information

As previously described above, the first step in the process is for threads to share information about their next network operation with other threads. The sharing of information may be performed using different methods that may vary depending upon a particular implementation. According to an embodiment, threads share information about their next network operation with their directly adjacent upwards neighbor thread by invoking a primitive to "shuffle" data to the adjacent upwards neighbor thread.

For purposes of explanation, the term "shuffle" refers to a thread sharing data with another thread, and the term "directly adjacent upwards neighbor thread" is thread that is next highest in an ordering or sequence of threads. Threads may be ordered numerically, or alphanumerically, and have corresponding identification data that uniquely identifies the thread. For example, four threads may have corresponding thread IDs of "0," "1," "2," and "3." In this example, thread "1" is the directly adjacent upwards neighbor thread of thread "0."

The information shared between threads specifies attributes of the thread's next network operation. According to an embodiment, the attributes include a local address on the node of the thread where data will be retrieved from or stored to, depending upon the type of operation, a remote address on another node where data will be retrieved from or stored to, depending upon the type of operation, a processing element on the other node that will perform the operation, an operation, and a size of the data. Other attributes may be included in the information, depending upon a particular implementation, and embodiments are not limited to this example. Table 1 below includes example pseudo code for shuffling next operation information to another thread.

TABLE 1

```
lower_lcl = shfl_up(lcl, 1);
lower_rmt = shfl_up(rmt, 1);
lower_pe = shfl_up(pe, 1);
lower_op = shfl_up(op, 1);
lower_size = shfl_up(size, 1);
```

Where "shfl_up" corresponds to the shuffle primitive, the first parameter value is the local address ("lcl"), the second parameter is the remote address ("rmt"), the third parameter is the processing element ("pe") that will perform the operation, e.g., a particular node and/or process, the fourth parameter is the operation ("op"), and the fifth parameter is the size of the data ("size"). The "1" parameter specifies that the information is to be provided to the directly adjacent upwards neighbor thread, i.e., the next higher thread in the sequence or order.

FIG. 2 is a block diagram 200 that depicts shuffling information between threads that specifies attributes of a thread's next network operation. The example of FIG. 2 depicts each thread invoking a primitive to provide data that specifies their next network operation ("op") to the directly adjacent upwards neighbor thread, e.g., thread 0 provides its op value of "1" to thread 1, thread 1 provides its op value of "1" to thread 2, and thread 2 provides its op value of "1" to thread 3. An op value of "1" corresponds to a first operation, such as a remote load operation and an op value of "2" corresponds to a different operation, such as a remote store operation. Thus, the next network operations for threads 0, 1 and 2 are the same, but the next network operation for thread 3 is different. Embodiments are applicable to any type and number of operations that may vary depending upon a particular implementation. Thread 3 does not share the attributes of its next network operation with another thread since thread 3 is the last thread in the thread sequence. Other attributes, such as the local address, the remote address, the data size and the processing element, are shuffled between threads in the same manner and are not depicted in FIG. 2 for purposes of explanation.

III. Determine Coalescability with Other Threads

After threads have shared the attributes of their next network operation with another thread, each thread determines whether its next network operation can be combined with the next network operation of another thread, i.e., determines its coalescability with another thread. To determine its coalescability with another thread, a thread compares the attributes of its next network operation with the attributes of the next network operation of another thread to determine whether the two operations can be combined, i.e., implemented by a single network operation. For example, the next network operations for two threads that are both remote store operations to store that same amount of data to contiguous memory addresses on the same processing element may be combined, i.e., implemented by a single network operation, by changing the value of the size parameter in the network command packet. Thus, the network operations for the two threads can be implemented by a single network command packet issued by one of the threads instead of each thread issuing its own network command packet. On the other hand, next network operations that are for different operations, operations to different processing elements, or for different size data or non-contiguous memory addresses cannot be implemented by a single network operation, without providing additional information, and require separate network command packets be generated and issued, one for each thread.

According to an embodiment, each thread determines its coalescability with its adjacent lower neighbor thread, i.e., whether its next network operation can be combined with the next network operation of its adjacent lower neighbor thread, which is the thread having the next lower thread ID in a thread sequence. A thread makes this determination by comparing the attributes of its own next network operation with the attributes of the next network operation of its adjacent lower neighbor thread, using the data shuffled up from the adjacent lower neighbor thread.

Table 2 below includes example Boolean logic implemented by a thread for determining whether the next network operation of the thread can be combined with the next network operation of its adjacent lower neighbor thread into a single network operation. Boolean logic may be efficiently processed by threads and the result stored in memory, such as a register.

TABLE 2

```
bool coalescable =
   (wv_mask & (1LL << (wv_id − 1))) &&   // Ensure lower lane is active
   (lower_size == size) &&               // Ensure lower lane size is equal
```

TABLE 2-continued

```
((lower_src + size) == src) &&      // Ensure I cover lower src
((lower_dst + size) == dst) &&      // Ensure I cover lower dst
(op == lower_op) &&                 // Must be doing the same operation
(pe == lower_pe) &&                 // Must be sending to the same processing element
(wv_id != 0);                       // thread zero is never coalescable
```

Two next network operations are coalescable when all of the conditions of the above Boolean logic are true. Threads with an inactive or absent adjacent lower neighbor thread are not coalescable with their adjacent lower neighbor thread. Threads may be deactivated, for example, to process conditional branches. The size parameter ensures that the size of data to be processed by both threads is the same. The source (src) and destination (dst) address parameters ensure that the addresses are contiguous. The operation (op) and processing element (pe) parameters ensure that the next network operation of both threads will process the same operation on the same processing element. The last variable tests whether the current thread is the lowest thread in the sequence, i.e., thread 0 in FIG. 2.

In the examples described herein, thread 0 is designated as not coalescable to ensure that at least one thread will generate and issue a network command packet. Otherwise, if all threads were determined to be coalescable, no network commands would be generated and issued. Embodiments are not limited to the example of thread 0 being designated as not coalescable and any thread may be designated as not coalescable. Also, the highest thread in the sequence, e.g., thread 3, may be configured to shuffle the information that specifies attributes of its next network operation information to the lowest thread in the sequence, e.g., thread 0. For example, a group of threads may include 20 threads, designated as thread 0 through thread 19, with thread 10 designated as not coalescable and thread 19 configured to share its next network operation information with thread 0.

In the example of FIG. 2, threads 1 and 2 are coalescable with their adjacent lower neighbor thread, threads 0 and 1 respectively, because their next network operation is the same. It is presumed that the other requirements are also satisfied, e.g., contiguous memory addresses, same data size, lower lane is active, and the operations are to be performed by the same processing element. Thread 3, however, is not coalescable because its next network operation, as indicated by the value "2," is different than the operation of its adjacent lower neighbor thread (thread 2), indicated by the value "1."

IV. Sharing Coalescability Results with Other Threads

After threads have determined the coalescability with their adjacent lower neighbor thread, the results are shared with other threads. This may be accomplished, for example, by each thread sharing its Boolean value as a predicate to a ballot voting function such as lowerNeighborCoal=_ballot (coalescable). The results may be represented by a plurality of bits that is stored locally, for example in a register, where each bit in the plurality of bits corresponds to a particular thread and the bit value specifies whether the corresponding thread is coalescable with its adjacent lower neighbor thread. Embodiments are described hereinafter in the context of the plurality of bits in the form of a bit vector for purposes of explanation, but embodiments are not limited to a bit vector per se, and other bit organization methodologies may be used.

Figure 3:
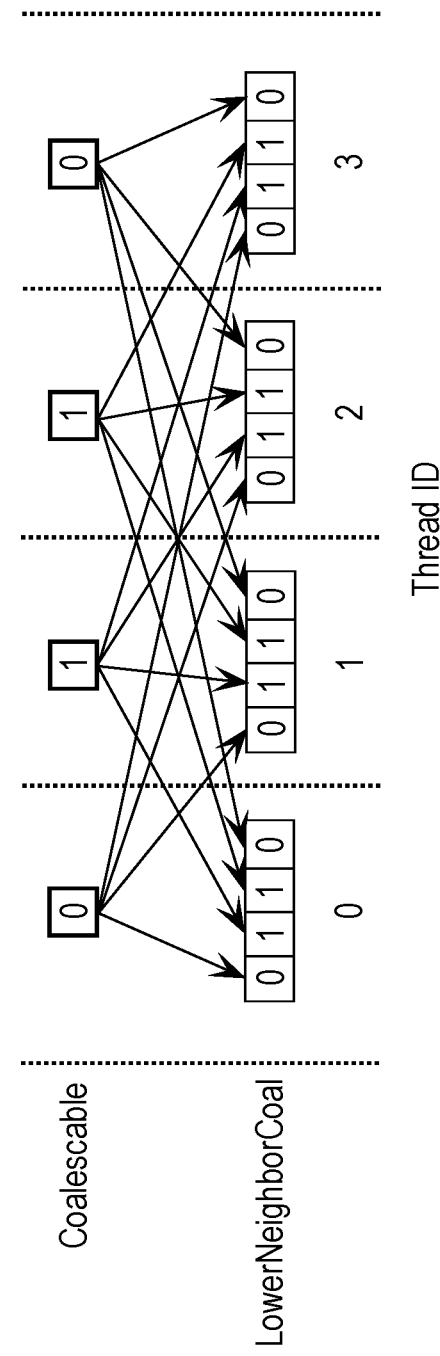
FIG. 3 is a block diagram that depicts using bit vectors to share coalescence results among threads.

FIG. 3 is a block diagram 300 that depicts using bit vectors to share coalescability results among threads. In this example, each of the four threads has access to a bit vector that indicates whether each of the four threads are coalescable with their adjacent lower neighbor thread. The bit vectors may be stored in a register designated for each thread. Alternatively, in implementations where threads have access to a common storage location such as a common register, a single bit vector may be stored in the common register and accessed by all threads.

In the example of FIG. 3, each thread provides a single "predicate" value that is used to populate the bit vector for each thread. As previously described in the example above with respect to FIG. 2, thread 0 is designated as not coalescable and thread 3 is not coalescable because the next network operation for thread 3 is a different operation than the next network operation for thread 2. Thread 1 and 2 are coalescable with their respective adjacent lower neighbor threads 0 and 1 because their next network operation is the same and the other requirements are also satisfied, e.g., contiguous memory addresses, same data size, lower lane is active, and the operations are to be performed by the same processing element. Accordingly, the values in the bit vector are "0110" to indicate that threads 0 and 3 are not coalescable and threads 1 and 2 are coalescable.

V. Generating Coalesced Network Command Packets

After all the threads have populated the bit vectors to specify whether they are coalescable, all of the threads have a consistent view of which threads are coalescable with their adjacent lower neighbor thread. Each thread examines their respective bit vector to determine whether they need to generate and issue a network command packet and if so, which network operations need to be implemented by the network command packet. Threads that are not coalescable generate and issue a network command packet that implements its own next network operation and the next network operations of all the coalescable threads in the bit vector between itself and the next thread that is not coalescable. Threads that are coalescable do not generate and issue a network command packet since their next network operation will be implemented by a network command packet generated and issued by another thread and more specifically, by the next lower thread in the sequence that is not coalescable. According to an embodiment, all threads perform this process in parallel since they are part of the same wavefront.

FIG. 4A is a block diagram 400 that depicts how threads use the populated bit vectors to determine whether they need to generate and issue a network command packet and if so, which network operations need to be implemented by the network command packet. Each thread examines the value of its own bit in the bit vector and if the value is "1," then the thread is coalescable and will not generate and issue a network command packet, so no further action is needed. If the bit value is "0," then the thread is not coalescable and the thread will generate and issue a network command packet. The network command packet implements the next network operation of the thread and may, or may not, implement the next network operations of other threads, depending upon the bit values in the bit vector. A thread that is not coalescable examines the bit values of the threads to the right in the bit vector, and every thread with a bit value of "1," up to the next thread with a bit value of "0," will be combined with the current thread. This means that the network command packet of the thread will implement its next network operation and the next network operations of every thread to the right in the bit vector up to, but not including, the thread with a "0" bit value, since this thread will generate and issue its own network command packet. This generates the largest possible network command packet.

In the example depicted in FIG. 4A, thread 0 examines its own bit value and since it is "0," thread 0 knows it is not coalescable and will generate and issue a network command packet. Thread 0 then examines the bit values to the right in the bit vector until it locates a thread with a bit value of "0." The next network operations of the threads in between are implemented by the network command packet of thread 0. Since both threads 1 and 2 have bit values of "1," the next network operations of threads 1 and 2 are implemented by the network command packet generated by thread 0. This is done because since thread 1 is coalescable with thread 0 and thread 2 is coalescable with thread 1, thread 2 is also coalescable with thread 0. Thus, the next network operations of threads 0, 1, and 2 can be implemented by a single network command packet that is generated by thread 0. As depicted in FIG. 4A, thread 0 "absorbs" three messages, i.e., next network operations, including its own and those of threads 1 and 2. Accordingly, threads 1 and 2 do not need to issue messages, i.e., generate and issue network command packets. Thread 3 has a bit value of "0" and therefore generates and issues its own network command packet. Since thread 3 is not coalescable, the network command packet generated and issued by thread 3 implements only its own next network operation. Using this approach, two network command packets are generated and issued instead of four network command packets that would be generated and issued using conventional approaches, which reduces overhead and improves network efficiency and performance.

FIG. 4B is a block diagram 450 that depicts an example bit vector for 16 threads and which threads are coalesced using the techniques described herein. For purposes of explanation, the 16 threads are discussed hereinafter as threads 0 through 15. Thread 0 has a bit value of "0" and is not coalescable and generates a network command packet that implements the next network operation of thread 0. The network command packet issued by thread 0 does not implement next network operations of any other threads because the next bit value to the right in the bit vector, for thread 1, also has a value of "0," indicating that thread 1 is not coalescable with thread 0 and therefore generates and issues its own network command packet. As previously described herein, thread 1 is not coalescable with thread 0 if the corresponding next network operations are not combinable, e.g., because of different operations or different processing elements, non-contiguous memory addresses or different size data.

All the threads between thread 1 and thread six, i.e., threads 2-5, have a bit value of "1" indicating that they are coalescable, so the network command packet generated and issued by thread 1 implements the next network operation of thread 1 and the next network operations of threads 2-5. Thread 7 is coalescable with thread 6 but thread 8 is not coalescable with thread 7, so thread 6 generates and issues a network command packet that implements its own next network operation and the next network operation of thread 7. Thread 8 is not coalescable and threads 9-15 are coalescable with thread 8, so thread 8 generates and issues a network command packet that implements its own next network operation and the next network operation of threads 9-15. So, using the thread coalescing approach described herein, only four network command packets are generated and issued, by threads 0, 1, 6 and 8, instead of 16 separate network command packets using conventional approaches.

Network command packets that implement the next network operation of multiple threads include parameter values that "cover" all of the next network operations. FIG. 5A depicts example contents of network command packets for threads 0-2 to implement the next network operation of each thread. Assuming that the three threads are coalesced as described herein, thread 0 generates and issues a network command packet that implements the next network operation of all three threads. FIG. 5B depicts example contents of a network command packet generated by thread 0 that implements the next network operations for all three threads. In this example, the source and destination addresses for thread 0 are used since the three network operations are to contiguous memory addresses. The processing element and operation values are the same for all three threads and are included in the network command packet. The value of the size parameter is adjusted to account for the total amount of data for all three threads, which is three times the size value for thread 0. The processing element processes the network command packet and executes the specified command to implement the next network command operation for the corresponding threads.

Table 3 below includes example pseudo code for generating and issuing a network command packet for a thread that is not coalescable.

TABLE 3

```
if (!coalescable) {
    int coal_size = size;
    // Remove all lower thread IDs
    lowerNeighborCoal >>= (wv_id + 1);
    /*
    * Invert and find the first bit index set to zero (first higher thread
    *   not coalescable with its lower neighbor). I am responsible for
    *   coalescing everything between my own index and this one.
    */
    uint32_t coalMsgs = ffsll(~lowerNeighborCoal);
    if (coalMsgs)
        coal_size += size * (coalMsgs − 1);
    write_network_msg(coal_size, op, raddr, laddr, pe)
}
```

The approach described herein for coalescing next network operations from different threads into a single network command packet can provide significant performance improvements by reducing the number of network command packets generated and issued by threads. Although embodiments are described herein in the context of the network operation of each thread operating on the same size data, this is a common scenario in GPU-SIMT architectures. The approach may be extended to threads operating on different size data by including a mechanism for coalesced threads to share their respective data size with the thread to which they are being coalesced. In the prior example, threads 1 and 2 would share their respective data size with thread 0 to enable thread 0 to include correct memory address values in the network command packet. The approach described herein for coalescing network command packets may be selectively instantiated, for example, via a configuration parameter or control value. The approach may also be instantiated in response to runtime information that indicates that it is desirable to use the approach.

The invention claimed is:

1. A processing unit comprising circuity to execute a sequence of concurrent threads, wherein a particular thread of the sequence of concurrent threads is configured to:
   receive, from an adjacent thread in the sequence of concurrent threads, attributes of a network operation for the adjacent thread;
   determine, based on the attributes of the network operation for the adjacent thread, whether a network operation for the particular thread can be combined with the network operation for the adjacent thread; and
   in response to the particular thread determining that the network operation for the particular thread can be combined with the network operation for the adjacent thread:
      generate a network command packet that implements the network operation for the particular thread and the network operation for the adjacent thread, and
      cause the network command packet to be issued.

2. The processing unit of claim 1, wherein the particular thread is further configured to:
   compare the attributes of the network operation for the adjacent thread to attributes of the network operation for the particular thread to determine whether the network operation for the particular thread can be combined with the network operation for the adjacent thread.

3. The processing unit of claim 1, wherein the particular thread is further configured to:
   determine whether the network operation of the particular thread is combinable with a network operation of a third thread, and
   provide, to the adjacent thread, data that specifies whether the network operation of the particular thread is combinable with the network operation of the third thread.

4. The processing unit of claim 1, wherein the particular thread is further configured to determine that the network operation for the particular thread can be combined with the network operation for the adjacent thread in response to the network operation for the particular thread and the network operation for the adjacent thread specifying a same operation, contiguous memory addresses, and same size data on a same processing element.

5. The processing unit of claim 1, wherein:
   the processing unit further comprises a plurality of bits, wherein a value of each bit, of the plurality of bits, specifies whether a network operation of a corresponding thread is combinable with a network operation of an adjacent neighbor thread, and
   the particular thread is further configured to examine the plurality of bits to identify the adjacent thread.

6. The processing unit of claim 5, wherein a bit corresponding to the adjacent thread is adjacent to a bit corresponding to the particular thread in the plurality of bits.

7. The processing unit of claim 6, wherein bits corresponding to adjacent neighbor threads to the particular thread are between the bit corresponding to the particular thread and a bit corresponding to another thread that is not combinable with other threads in the plurality of bits.

8. The processing unit of claim 1, wherein the network command packet includes a size parameter value that is a multiple of a size parameter value from the network operation of the particular thread.

9. A method comprising:
   receiving, by a particular thread in a sequence of concurrent threads executing on a processing unit, from an adjacent thread in the sequence of concurrent threads, attributes of a network operation for the adjacent thread;
   determining, by the particular thread, that a network operation for the particular thread can be combined with the network operation for the adjacent thread;
   generating, by the particular thread, a network command packet that implements the network operation for the particular thread and the network operation for the adjacent thread; and
   causing, by the particular thread, the network command packet to be issued.

10. The method of claim 9, further comprising:
    comparing, by the particular thread, the attributes of the network operation for the adjacent thread to attributes of the network operation for the particular thread to determine whether the network operation for the particular thread can be combined with the a network operation for the adjacent thread.

11. The method of claim 9, further comprising:
    determining, by the particular thread, whether the network operation of the particular thread is combinable with a network operation of a third thread, and
    providing, by the particular thread, to the adjacent thread, data that specifies whether the network operation of the particular thread is combinable with the network operation of the third thread.

12. The method of claim 9, wherein the determining is in response to the network operation for the particular thread and the network operation for the adjacent thread specifying a same operation, contiguous memory addresses, same size data on a same processing element.

13. The method of claim 9, wherein:
    the processing unit further comprises a plurality of bits, wherein a value of each bit, of the plurality of bits, specifies whether a network operation of a corresponding thread is combinable with a network operation of an adjacent neighbor thread, and
    the method further comprises examining, by the particular thread, the plurality of bits to identify the adjacent thread.

14. The method of claim 13, wherein a bit corresponding to the adjacent thread is adjacent to a bit corresponding to the particular thread in the plurality of bits.

15. The method of claim 14, wherein bits corresponding to adjacent neighbor threads to the particular thread are between the bit corresponding to the particular thread and a bit corresponding to another thread that is not combinable with other threads in the plurality of bits.

16. The method of claim 9, wherein the network command packet includes a size parameter value that is a multiple of a size parameter value from the network operation of the particular thread.

17. One or more memories storing instructions which, when processed by a processing unit, cause:
    a particular thread in a sequence of concurrent threads to be executed that is configured to:
       receive, from an adjacent thread in the sequence of concurrent threads, attributes of a network operation for the adjacent thread; and
       in response to the particular thread determining that a network operation for the particular thread can be combined with the network operation for the adjacent thread:

generate a network command packet that implements the network operation for the particular thread and the network operation for the adjacent thread, and cause the network command packet to be issued.

18. The one or more memories of claim 17, wherein the particular thread is further configured to:
compare the attributes of the network operation for the adjacent thread to attributes of the network operation for the particular thread to determine whether the network operation for the particular thread can be combined with the network operation for the adjacent thread.

19. The one or more memories of claim 17, wherein the particular thread is further configured to:
determine whether the network operation of the particular thread is combinable with a network operation of a third thread, and
provide, to the adjacent thread, data that specifies whether the network operation of the particular thread is combinable with the network operation of the third thread.

20. The one or more memories of claim 17, wherein the particular thread is further configured to determine that the network operation for the particular thread can be combined with the network operation for the adjacent thread in response to the network operation for the particular thread and the network operation for the adjacent thread specifying a same operation, contiguous memory addresses, and same size data on a same processing element.

* * * * *